UNITED STATES PATENT OFFICE
PTO – BOYERS, PA DUTY STATION

---

PAGE NOT AVAILABLE

PATENT NUMBER X6105 FOR THE ISSUE DATE 10/1/1830 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing All Drawings

DATA CONVERSION OPERATION
BOYERS, PA

10/1/1830 6105X

Matthew D. Brown
Letters Patent dated October 1st 1830

The Schedule referred to in these Letters Patent & making part of the same, containing a description in the words of the said Matthew D. Brown himself, of his improvement in Ferry Boats Be it known that I, Matthew D. Brown of Mason County State of Virginia, have made an improvement in Ferry Boats, & in propelling the same, which is described as follows;

This Ferry Boat, with the apparatus used in propelling it, consist of the following principal parts; Viz: 1st The Boat, 2nd The lee board, 3rd The uprights & rollers for regulating the depth of the lee board, 4th The pulleys & windlass for steering the boat; 5th The Windlass for raising & lowering the Lee board, 6th The Skiff or float for supporting the sway of the rope. 1st The Boat is constructed in the ordinary manner of Ferry Boats, adapted to the purposes required. 2nd The lee board is made of nearly the length of the boat about 5 feet deep, adapted to the current of the water — It has three Standards, fastened to it & extending above & some what more than the depth of the Lee Board —

3rd The Uprights & rollers for regulating the depth to which the Lee board shall enter the water. There are three uprights fastened to the sides of the Boat, one near each end & one near the middle on each of these uprights is a roller, turning on an axle, supported by two arms connected with the uprights;

10/1/1830 6105X

& between which & the upright the Standards of the Lee Board
pass. On the lower edge of the gunnel of the Boat, presented to
the stream are three friction rollers, against which the Lee
Board passes, when raised or lowered.
5th The Windlass for raising & lowering the Lee Board is fix
ed in or near the centre of the boat. A fixed rope, fastened to
the centre Standard (which Slides in a groove) is wound by
the Windlass round a barrell; this rope passes thro a
block & pulley on which a weight can be hung for keep
ing it tight—
6th The Skiff or float, is in the shape of a common
Skiff, sharp at both ends, having a Mast in the centre,
to the top of which the rope is made fast. The float is
kept in its place & in a proper direction by short ropes
fastened to the Main rope, above and below the float—
Operation. A rope or wire of sufficient length &
Strength is made fast at one side of the river or stream,
at a proper height & distance: it is fastened to the Masts
of the float or floats: it then passes to an iron ring, where
it is made fast. Another rope fastened to this ring passes
round two pulleys one on each end of the Boat, & round the
windlass for steering it, two or three times, this windlass is
made permanent near the centre of the boat. The
Lee Board is lowered by means of the windlass or wheel,
according to the strength of stream or current, the head
of the boat is kept in a proper direction by means of the
Steering Wheel; & the strength of the current operating on
the Lee Board, forces the boat across the Stream.
An Ice breaker or crusher, is placed in the front
of the boat, & is made by bracing together two peices of
timber of sufficient length & Strength at an angle of
about 32°— The lower peice is shod with iron—

10/1/1830 6105X

The Invention here claimed, is the fixing of a long rope or wire on one side of a river or Stream, & holding up the rope or wire by floats: the mode of raising & depressing the Ice Boards; the mode of steering the boat, & the icebreaker. For a further illustration of my invention I refer to the Model & drawing of the same deposited in the Patent Office.

In testimony that the foregoing is a true Specification or description of my invention, I have subscribed my name before two Witnesses & made Oath to the same at the County of Mason this 7th day of July 1830.

Witnesses
William McComas Jr
George Craig

Matw D. Brown

[illegible] 888 words (Received and recorded 16 Jany 1844)